J. H. BRIMSON.
VARIABLE SPEED MECHANISM.
APPLICATION FILED APR. 23, 1915.
1,166,656.
Patented Jan. 4, 1916.
3 SHEETS—SHEET 1.
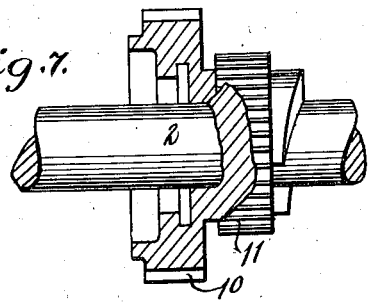
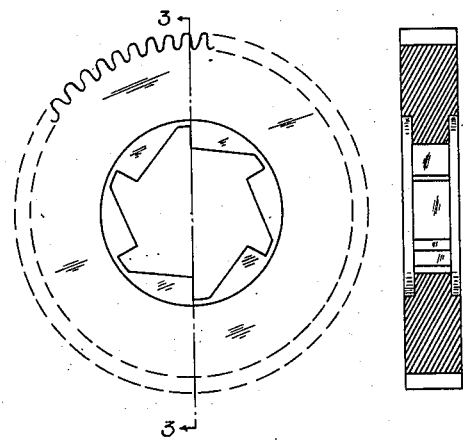
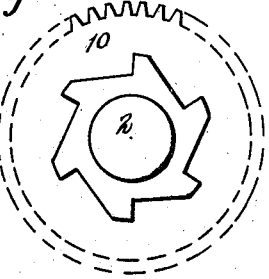
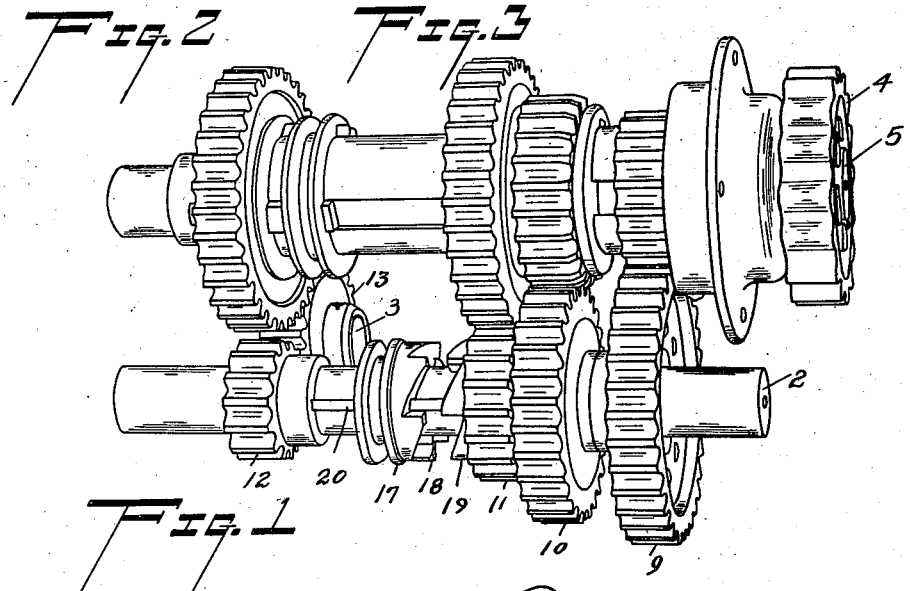
WITNESSES:
INVENTOR
James H. Brimson
BY
Geo. B. Willcox
ATTORNEY

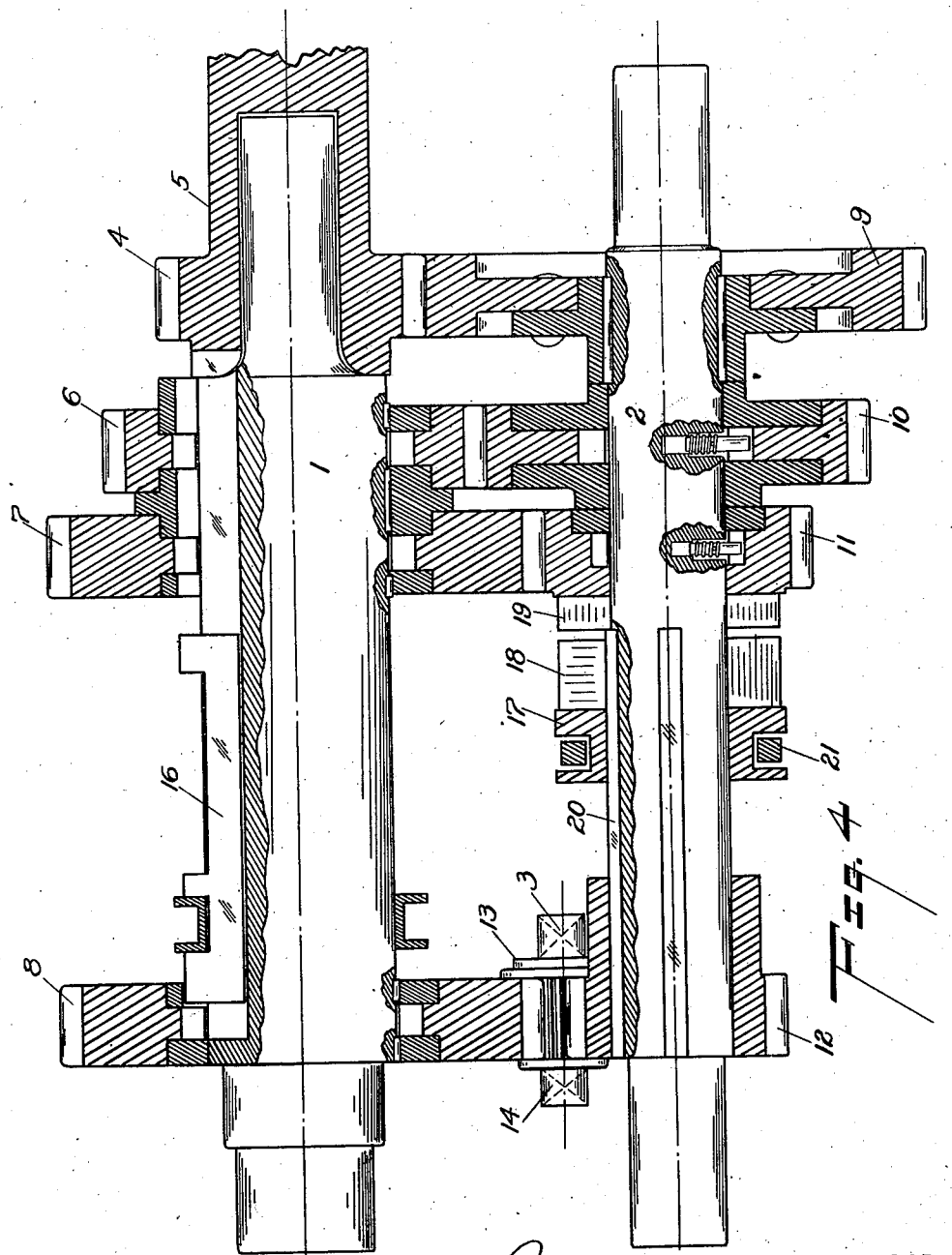

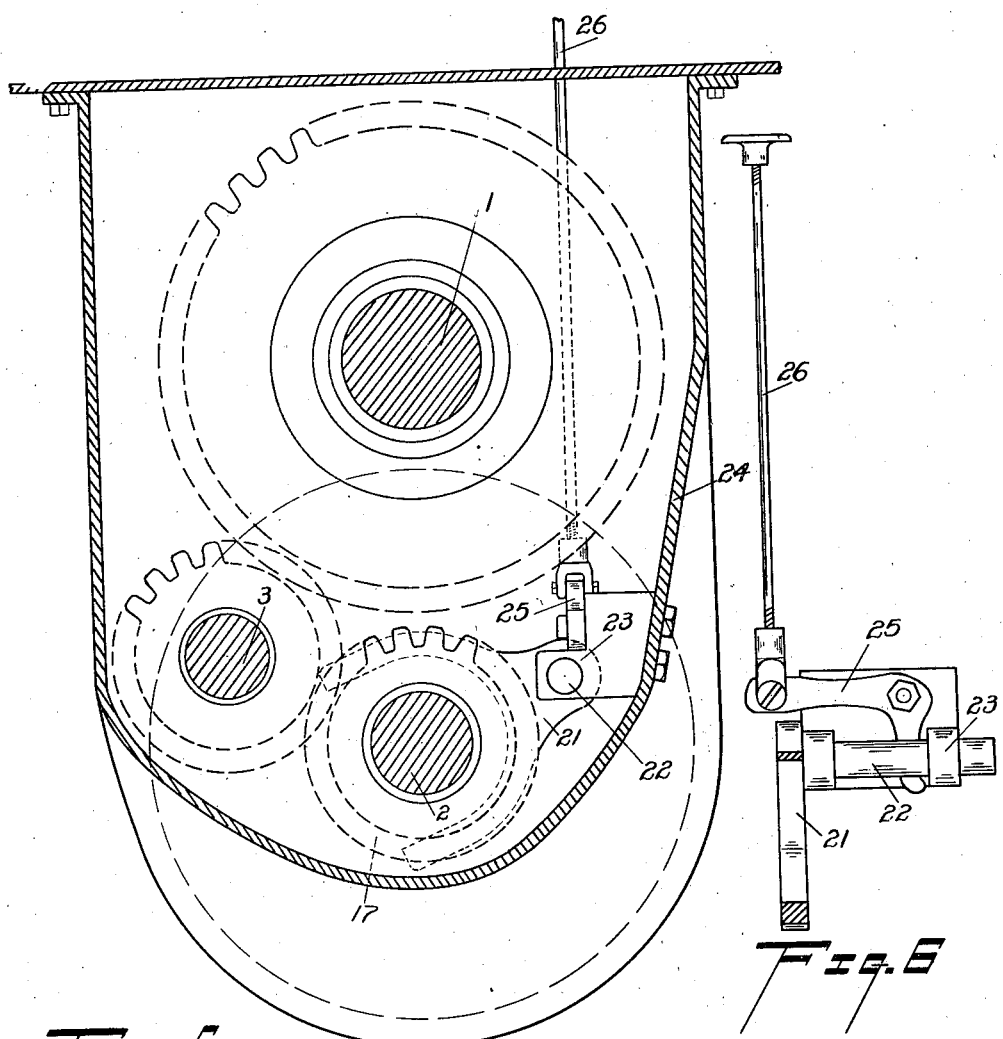

UNITED STATES PATENT OFFICE.

JAMES H. BRIMSON, OF SAGINAW, MICHIGAN, ASSIGNOR OF ONE-HALF TO WILLIAM H. HART, OF SAGINAW, MICHIGAN.

VARIABLE-SPEED MECHANISM.

1,166,656.  Specification of Letters Patent.  Patented Jan. 4, 1916.

Application filed April 23, 1915. Serial No. 23,340.

*To all whom it may concern:*

Be it known that I, JAMES H. BRIMSON, a citizen of the United States, residing at Saginaw, in the county of Saginaw and State of Michigan, have invented certain new and useful Improvements in Variable-Speed Mechanism; and I do hereby declare the following to be a full, clear, and exact description of the invention, such as will enable others skilled in the art to which it appertains to make and use the same.

This invention relates to change speed gears and transmissions such as are commonly employed in the transmission of automobiles and like machines, in which a number of speeds ahead are required and one or more speeds to reverse.

My invention applies more particularly to that class of change speed mechanisms in which the speed is changed by throwing gears of different speed ratios into and out of operation, and in which the teeth of the gears are not disengaged or slid into mesh when change of speed occurs, but are thrown into and out of operation by means of sliding keys engaging the hubs of the gears, or by equivalent means.

In the type of change speed mechanism to which my present improvement is especially adapted, all the gears are rotating all of the time when the machine is in operation, so that a shift from one speed to another may be made while the gears are in motion, it being unnecessary to start a gear from rest when a shift in speed is to be made. In the type of mechanism referred to, means is provided by which change of speed from high to low may be made without shifting the clutch and with only a slight change in the speed of the engine, and all of the changes in speed are adapted to be controlled by a single lever.

My present improvement relates more particularly to a device incorporated in a change speed mechanism having the characteristics above enumerated, whereby the mechanism is better adapted for use in very hilly country where it is desirable to use the engine as a brake, to operate as a compressor and supply braking resistance to the car while descending a steep grade.

It is common in the general type of slide-gear transmissions which are well known in the art, to utilize the engine as a brake while descending hills, but only in a limited way. It is of course evident that in descending a hill the engine is more effective as a brake when it is in low gear, for the reason that the momentum of the car while descending the hill is then absorbed by tending to rotate the engine at its highest speed against the resistance of its compression.

When the brow of a hill is approached and descent is commenced on low gear, the slide transmission will effectively utilize the engine as a brake, but frequently the brow of the hill is approached on high speed, and if, with the slide transmission, it is desired to use the engine as a brake in descending the hill, the engine, being still in high gear, will not be very effective as a brake, for the reason that the engine is then revolved by the momentum of the car at a much lower speed than it would be if the engine were connected in low gear. It frequently occurs that the braking power of the engine when connected in high gear, is not enough to sufficiently check the speed of the car and with a slide gear transmission it is extremely difficult and sometimes dangerous to shift the gears during the descent of the hill from high to low speed, in order to utilize the increased braking power of the engine at low gear. The difficulty of making the shift with slide transmission from high to low while descending the hill arises from the fact that the shift of a slide transmission necessitates, first, throwing out the clutch, then shifting the gears from high to neutral and again shifting the gears to throw the low gear into mesh. Meanwhile the momentum of the car is revolving the gears at a high rate of speed and it is exceedingly difficult to properly mesh them. Consequently it is seldom attempted to shift the gears of a slide transmission while descending a hill, in order to increase the braking power of the engine by throwing it into low speed. With my improvement, on the other hand, I am enabled while descending the hill, not only to shift from high to low without endangering the gears, but I am also enabled to make the shift without operating the clutch and by the minipulation of a single lever.

I will first describe the general arrangement of the change speed gear to which my present improvement is applied.

In the drawings, Figure 1 is a perspective view of the change speed gears with the case removed. Fig. 2 is a diagrammatic side view of one of the gears on the counter shaft. Fig. 3 is a vertical section through the same, taken on the line 3—3 of Fig. 2. Fig. 4 is a longitudinal section, broken away in part, showing the main shaft and the counter-shaft of the change speed mechanism. Fig. 5 is a part sectional end view of the case showing the relative arrangement of the shafts and gears with my improved shifting device attached. Fig. 6 is a part sectional side view of the shifting device. Fig. 7 is a part sectional side view of a pair of gears formed integral. Fig. 8, is a diagrammatic end view of the parts shown in Fig. 7.

As is shown in the drawings, the device consists in a main shaft 1, counter-shaft 2, and idler-shaft 3, upon which proper gears are mounted. At one end of the main shaft and mounted to revolve loosely thereon is a drive gear 4 having a hub 5, to which driving power may be applied in any suitable manner. Loosely mounted upon shaft 1 is a plurality of gears, each of which is capable of revolving independently of shaft 1, as on a journal. I have shown three such gears, 6 being the intermediate speed gear, 7 the slow speed gear, and 8 the reverse gear. Counter-shaft 2 carries a gear 9 that meshes with gear 4 and gear 10 that meshes with gear 6, and gear 11 meshing with gear 7, and a gear 12 that meshes with a pinion 13 carried by the idler shaft 3, which may be revolubly mounted in suitable bearings 14 carried by the gear case 24. Gears 10 and 11 are arranged on shaft 2, so as to revolve freely on the shaft in one direction, and to be locked to the shaft when the gears are rotated in the opposite direction. Gears 9 and 12 are fixed to the shaft 2, and pinion 13 meshes with the reverse gear 8 on shaft 1.

By means of a sliding key 16 on the shaft 1, the speed ratios are changed by successive engagement of the key with the gears on that shaft, the general operation being as follows: Assuming that the engine has been driving the car direct-connected, that is, with the main-shaft 1 revolving at the full speed of the engine, and assuming that it is desired to change from this high speed to the lowest speed, the low speed gear is first locked to the shaft 1 by shifting key 16 until it engages the hub of gear 7, suitable jaws being provided in the hub for that purpose. Gear 7 had been previously revolving freely with relation to shaft 1, having been propelled by gears 4 and 9, shaft 2 and gear 11; and when key 16 is shifted so as to lock gear 7 to shaft 1, as above mentioned, gear 7 immediately picks up the speed of shaft 1, that speed being faster than the speed at which it had previously been propelled by gear 11. The speed of gear 11 is, therefore, accelerated, and it begins to turn faster than the shaft 2, upon which it is mounted. Gear 11 is mounted on shaft 2 so as to turn freely on it in one direction only, as has been noted above, and it, therefore, is capable of traveling in one direction at a faster speed than that of shaft 2. The car itself has been assumed to be traveling at a rate corresponding to high speed, and the main shaft 1 is revolving at a corresponding rate. The car, therefore, travels forward under its own momentum at high speed, while the engine continues to drive shaft 2 at a rate corresponding to slow speed. When the speed of the car has decreased until the speed of shaft 1 corresponds to the speed at which shaft 2 is being driven, gear 11 becomes locked to the shaft, and thereupon the engine begins to drive the car at slow speed. In a similar manner, any other speed can be thrown in by shifting the keys while the car is traveling at high speed, without the necessity of disengaging the main clutch of the engine, and when the keys are set for any lower speed the car will automatically pick up as soon as its speed has dropped to that of shaft 2. Likewise the gears corresponding to any higher speed can be picked up from any lower speed by merely shifting the keys, and the higher speed will be picked up without jar, if the speed of the car is first increased by using the accelerator in the usual well known manner.

The foregoing description sets forth the general construction and mode of operation of the type of transmission to which my present invention is especially adapted, as distinguished from the well known slide transmission.

My present improvement consists in adding means whereby the connection between the engine and the drive-shaft of the car may be changed from direct-connection or high speed to low speed, without shifting the clutch, whereby when the car is about to descend a hill, the engine may be actuated by the momentum of the car, the speed of the car being slow, while the speed of the engine, which now acts as a pump or compressor, is relatively high, thereby enabling the engine to serve as an effective absorber of the momentum of the car, while the car is traveling down grade.

As has already been described, gear 11 is loosely mounted on shaft 2, while gear 9 is keyed to the shaft. I provide on shaft 2 a sliding clutch which comprises a sleeve 17 having suitable jaws 18, which are adapted to engage corresponding jaws 19 formed integral with gear 11. Sleeve 17 is secured to shaft 2 by means of keys 20, along which the sleeve has a limited longitudinal movement. I will assume, for purpose of illustration, that the car is descending a hill on high speed, that is, with hub 5, which is connected to the engine, locked by means of key 16 to the main shaft 1, which is connected to the wheels of the car. The hub 5 and the shaft 1 will of course be traveling at the same speed, the momentum of the car operating the engine as a compressor and the engine thereby serving as a brake to check acceleration of the car. If however, it is found that the braking power with the gears set for high speed, is not sufficient, the driver may shift sleeve 17 along shaft 2 until jaws 18 and 19 interlock, thereby locking gear 11 to shaft 2. Thereupon the driver withdraws key 16 from its engagement with gear 4 and keys gear 7 to shaft 1. The momentum of the car will then drive shaft 1, gear 7, gear 11, shaft 2, gear 9 and gear 4 and the engine. This connection has a tendency to cause the momentum of the car to drive the engine at a faster rate than before and the engine thereupon exerts an increased braking resistance to further check the speed of the car as it does down the hill. Any suitable means may be employed for shifting the sleeve 17 to engage and disengage the jaws 18 and 19, but in practice I prefer to employ the shifting device shown in Figs. 5 and 6, or its equivalent.

21 is a fork adapted to engage the sleeve 17, the fork being mounted on a slidable rod 22 carried by suitable bearings or guides 23 attached to the gear case 24. Rod 22 has a limited longitudinal movement, being actuated by one arm of the L-lever 25. A push-rod 26 is preferably connected to the L-lever 25 and extends outside the gear case 24. The rod 26 preferably projects through the foot board of the car, so that it may be moved up or down by the driver's foot, to throw clutch teeth 18 into or out of engagement with teeth 19 of gear 11.

I have shown and described gears 10 and 11 on shaft 2 as being independent of each other, but for the purpose of my present improvement these gears might be formed integral or secured together in any suitable manner. If the two gears 10 and 11 are fastened together, it is then possible, by shifting key 16 so as to engage gear 6, to utilize the intermediate gears to actuate the engine while the car is going down hill in the same manner as has been described in explaining the action when low gear was employed.

Having thus described my invention, what I claim and desire to secure by Letters Patent is:

1. In combination with a change speed mechanism comprising a main shaft, a driving gear and a plurality of speed gears mounted thereon, keys for locking said gears respectively to said shaft, a counter shaft, gears carried thereby, certain of said gears adapted to revolve freely in one direction on said counter shaft, a slidable sleeve on said counter shaft, and a clutch member carried by said sleeve and adapted to engage one of the gears on said counter shaft and lock said gear to said shaft, for the purposes set forth.

2. In combination with a change speed mechanism comprising a main shaft, a driving gear and a plurality of speed gears mounted thereon, keys for locking said gears respectively to said shaft, a counter shaft, gears carried thereby, certain of said gears adapted to revolve freely in one direction on said counter shaft, a slidable sleeve on said counter shaft, and a clutch member carried by said sleeve and adapted to engage one of the gears on said counter shaft and lock said gear to said shaft, a fork engaging said sleeve, a push-rod, and means operatively connecting said push-rod and fork, adapted to move said fork lengthwise the shaft when the push-rod is raised and lowered, for the purposes set forth.

3. In combination with a change speed mechanism comprising a main shaft, a driving gear and a plurality of speed gears mounted thereon, means for locking said gears respectively to said shaft, a counter shaft, gears carried thereby, certain of said gears adapted to revolve freely in one direction only on said counter shaft, a slidable sleeve on said counter shaft, and a clutch member carried by said sleeve and adapted to engage one of the gears on said counter shaft and lock said gear to said shaft, for the purposes set forth.

In testimony whereof, I affix my signature in presence of two witnesses.

JAMES H. BRIMSON.

Witnesses:
  NELLIE M. ANGUS,
  J. V. CARPENTER.